United States Patent [19]

Hirose

[11] Patent Number: 4,564,819

[45] Date of Patent: Jan. 14, 1986

[54] PHASE DETECTING APPARATUS

[75] Inventor: Syunichi Hirose, Tokyo, Japan

[73] Assignee: Kabushiki Kaisha Toshiba, Kawasaki, Japan

[21] Appl. No.: 673,340

[22] Filed: Nov. 20, 1984

[30] Foreign Application Priority Data

Nov. 25, 1983 [JP] Japan ................. 58-221650

[51] Int. Cl.$^4$ ............ H03L 7/06; H03B 27/00; H02H 7/125; H02M 7/155; H02M 7/04
[52] U.S. Cl. ............................ 331/2; 331/14; 331/25; 331/45; 328/155; 363/53; 363/54; 363/87; 363/128; 363/129
[58] Field of Search ............... 331/2, 14, 25, 45, 55; 328/155; 363/53, 54, 87, 128, 129

[56] References Cited

U.S. PATENT DOCUMENTS 4,327,420 4/1982 Gdula .................. 331/45 X
4,438,487 3/1984 Kawai ................. 363/87 X

FOREIGN PATENT DOCUMENTS 0014149 2/1979 Japan ................... 363/54

Primary Examiner—Eugene R. LaRoche
Assistant Examiner—D. C. Mis
Attorney, Agent, or Firm—Schwartz, Jeffery, Schwaab, Mack, Blumenthal & Evans

[57] ABSTRACT

A phase detecting apparatus comprises a first PLL and a second PLL having a response time shorter than the response time of the first PLL. An AC voltage signal produced by the first PLL which is in phase with the detected AC voltage except until the expiration of the response time of the first PLL after an abrupt change in the phase of the detected AC voltage is normally applied to the second PLL. Until expiration of the response time of the first PLL after rising of the detected AC voltage to a certain level, the detected AC voltage is applied, in place of the AC voltage signal produced by the first PLL, to the second PLL. The second PLL provides a digital signal indicative of the phase of the detected AC voltage.

15 Claims, 4 Drawing Figures

PHASE DETECTING APPARATUS

BACKGROUND OF THE INVENTION

The present invention relates to a phase detecting apparatus particularly suitable for use in phase control or firing angle control of a power converter used for DC power transmission or frequency conversion.

Prior art phase detecting apparatus have a drawback in that they do not provide a satisfactory phase detection upon occurrence of a fault, as will be later described in detail.

SUMMARY OF THE INVENTION

An object of the invention is to provide a phase detecting apparatus which is capable of satisfactory detection of the phase even when the voltages are unbalanced because, for example, of a grounding fault, of the AC line, and is quick in resuming the phase detection operation upon restoration of the AC voltage after disappearance of the AC voltage.

According to the invention there is provided a phase detecting apparatus for detecting a phase of an AC voltage, comprising:

a first circuit comprising a phase-locked loop, receiving said AC voltage under detection, and producing an AC voltage signal which is in phase with said AC voltage under detection except until expiration of the response time of said phase-locked loop after any abrupt change in the phase of said AC voltage under detection, a second circuit comprising a phase-locked loop having a response time which is shorter than the response time of the phase-locked loop of said first circuit, and selecting means normally applying said AC voltage signal produced by said first circuit to said second circuit, and applying said AC voltage under detection or an AC voltage signal obtained by phase-number conversion from said AC voltage under detection to said second circuit until a predetermined time has expired after rising of said AC voltage under detection to a predetermined level, said second circuit producing a digital signal indicative of the phase of said AC voltage under detection.

BRIEF DESCRIPTION OF THE DRAWINGS

In the accompanying drawings

DETAILED DESCRIPTION OF THE PRIOR ART

Figure 1:
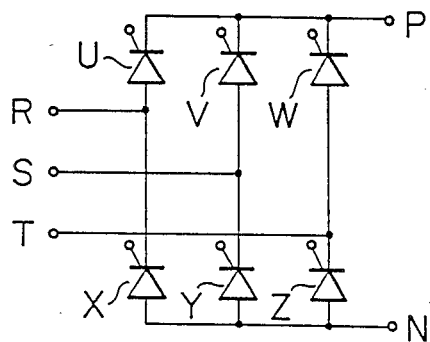
FIG. 1 is a circuit diagram showing a three-phase thyristor bridge used in a power convertor.

FIG. 1 shows a three-phase thyristor bridge which receives three-phase AC voltages R, S, T. The bridge includes thyristors U, V, W, X, Y, Z, each forming an arm of the bridge. The firing phase angle of each thyristor is so regulated as to control the DC voltage across the DC terminals P, N. The thyristor bridge shown is used for a power converter in DC power transmission or in frequency conversion.

Nowadays, digital computers are used for the firing angle control, and it is required that the phase angles of the three-phase AC voltages be precisely detected or measured and digital signals indicative of the phase angles be provided. To meet such a requirement, phase detecting apparatus with a phase-locked loop circuit (hereinafter referred to as PLL) are often employed.

Figure 2:
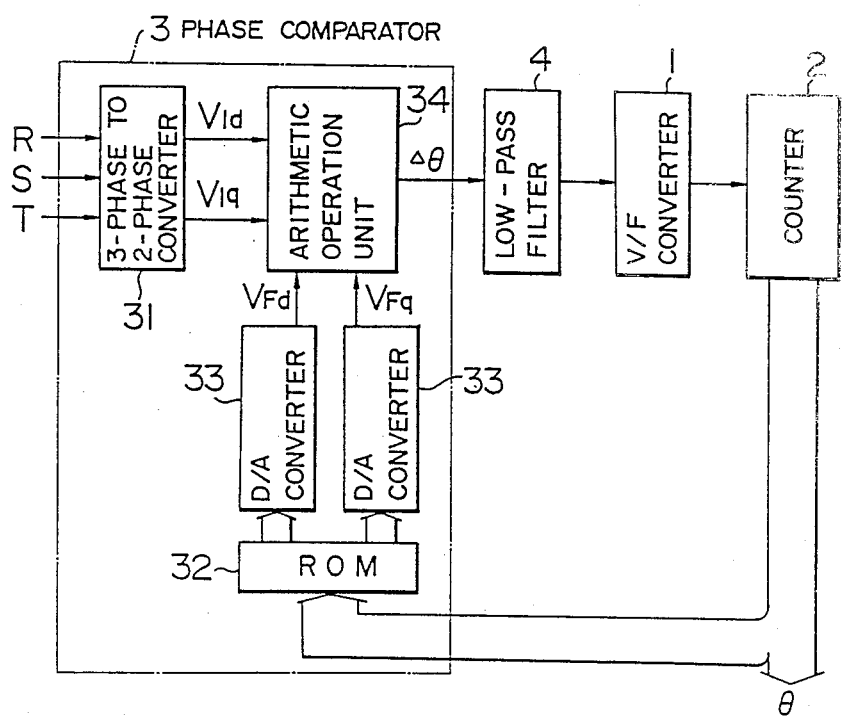
FIG. 2 is a block diagram showing an example of a conventional phase detecting apparatus.

FIG. 2 shows an example of a prior art phase detecting apparatus disclosed in Japanese Patent Application Laid-open (Kokai) No. 34851/1980, which comprises a V/F (voltage-to-frequency) converter 1 consisting of a voltage-controlled oscillator 1 whose oscillating frequency varies depending on the input voltage, a counter 2 counting the output pulses from the oscillator 1 to produce a digital count signal $\theta$ indicative of the phase angle of AC signals, such as three-phase AC voltages R, S, T being detected, a phase comparator 3 receiving, on one hand, the digital count signal $\theta$, and on the other hand, the three-phase AC voltages R, S, T to produce an analog phase difference signal $\Delta\theta$, and a low-pass filter 4 inserted between the phase comparator 3 and the V/F converter 1, for removing the harmonic components in the output of the phase comparator 3.

The phase comparator 3 comprises a three-phase to two-phase converter 31 converting the three-phase AC voltages R, S, T into two-phase AC voltage signals $V_{1d}$, $V_{1q}$ in phase with the three-phase signals R, S, T and having substantially no response delay in the conversion, an ROM (read-only-memory) 32 receiving, as its address information, the digital count signal $\theta$ from the counter 2 and producing the contents at the address as outputs having values indicative of the sine and cosine of the inputted signal $\theta$, successions of which form two-phase AC signals, D/A (digital-to-analog) converters 33a, 33b converting the outputs of the ROM 32 into analog signals $V_{Fd}$, $V_{Fq}$ which correspond to the two-phase AC signals $V_{1d}$, $V_{1q}$, and an analog-type arithmetic operation circuit 34 determining the phase difference $\Delta\theta$ between the two sets of two-phase AC signals $V_{1d}$, $V_{1q}$ and $V_{Fd}$, $V_{Fq}$.

In FIG. 2, the outputs of the three-phase to two-phase converter 31 may be expressed as follows:

$$\left.\begin{array}{l} V_{1d} = V_1 \cos \theta_1 \\ V_{1q} = V_1 \sin \theta_1 \end{array}\right\} \quad (1)$$

where $V_1$ represents a predetermined amplitude, $\theta_1$ represents a phase of the set of the three-phase signals R, S, T.

The outputs of the D/A converters 33a, 33b are expressed as follows:

$$\left.\begin{array}{l} V_{Fd} = \cos \theta_2 \\ V_{Fq} = \sin \theta_2 \end{array}\right\} \quad (2)$$

where $\theta_2$ represents the detected phase, whose significance is identical to that of the signal $\theta$. It is noted that the these signals $V_{Fd}$, $V_{Fq}$ have a unit amplitude.

The arithmetic operation circuit 34 performs the following arithmetic operation to determine the phase difference $\Delta\theta(=\theta_1-\theta_2)$ between the sets of signals $V_{1d}$, $V_{1q}$ and $V_{Fd}$, $V_{Fq}$.

$$\Delta\theta = \sin^{-1} \frac{V_{Fd} \cdot V_{1q} - V_{Fq} \cdot V_{1d}}{\sqrt{V_{1d}^2 + V_{1q}^2}} \quad (3)$$

The signal indicative of the phase difference $\Delta\theta$ is passed through the low-pass filter 4 and is applied to the V/F converter 1. Thus a feed-back loop is formed by which the phase difference $\Delta\theta$ is made smaller or zero, and a digital signal $\theta$ in synchronism with the detected three-phase AC voltages R, S, T are outputted by the counter 2. The digital signal $\theta$ thus obtained is used, e.g., for firing angle control of the three-phase thyristor bridge. The full-scale value of the counter 2 corresponds to 360°, and when the full-scale value is reached the counter 2 is automatically reset to zero and starts counting up again.

The response time of the phase detection is dependent mainly on the time constant of the low-pass filter 4, and a low-pass filter with an appropriate time constant is chosen for the particular application of the power converter.

The above-described phase detecting apparatus has a high performance and is very useful in digital control of firing angle control. But when it is used in a power converter for DC power transmission or the like it is not satisfactory for the following reason.

Namely, when a grounding fault and hence a voltage drop occur in one or two of the three-phase lines R, S, T, and if the phase detection response is designed to be quick, the detected value $\theta$ would be quite different from that obtained when the three-phase voltages are balanced.

The above-described problem could be overcome if the phase detection response is designed to be slower by making the low-pass filter 4 to have a larger time constant. But the slow phase detection response retards start of operation of the power converter after automatic reclosing of the line subsequent to (several hundreds msec. after) circuit breaking which is effected upon detection of a prolonged grounding fault of the line.

DETAILED DESCRIPTION OF THE EMBODIMENTS

Figure 3:
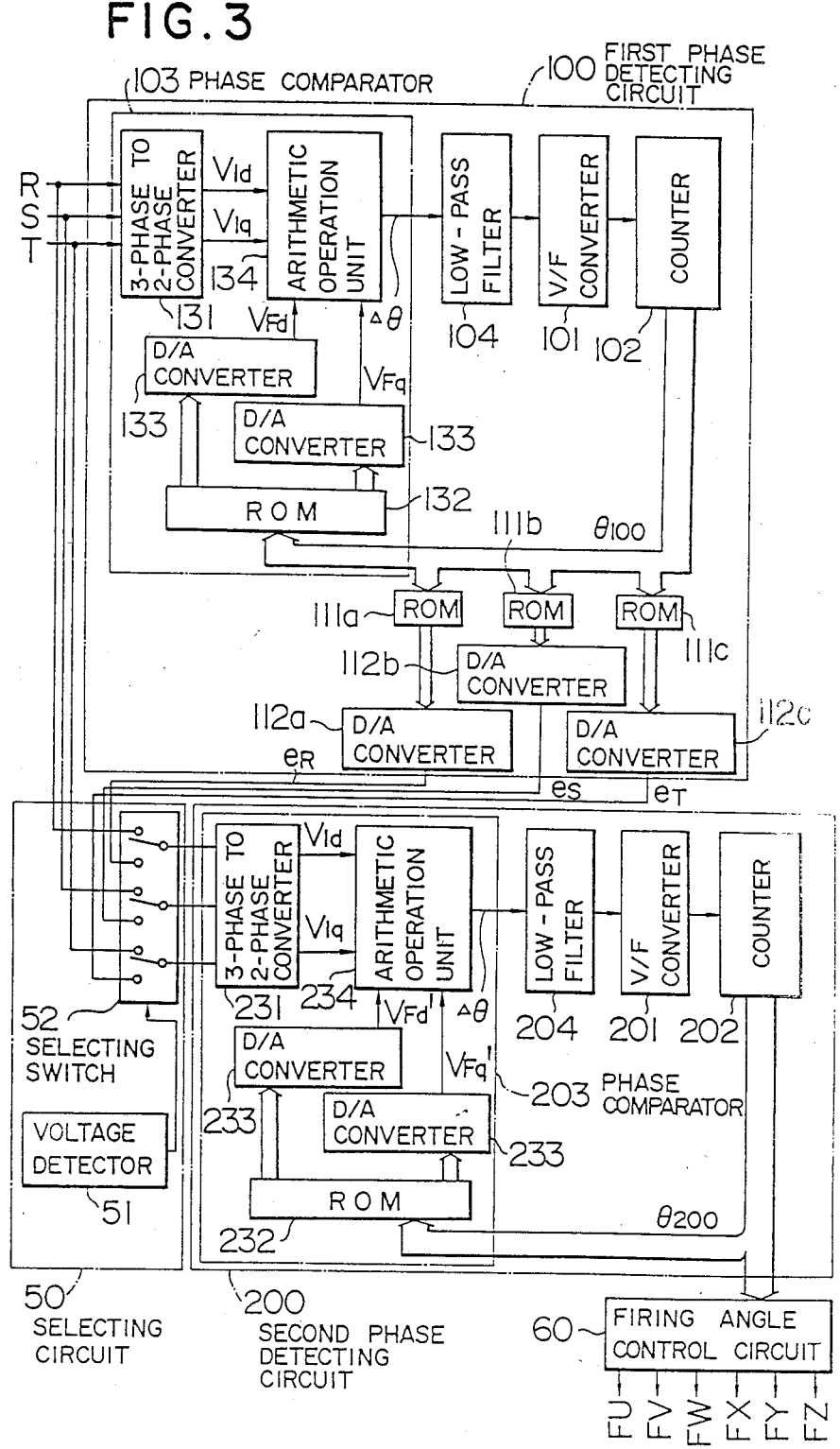
FIG. 3 is a block diagram showing an embodiment of a phase detecting apparatus according to the invention.

FIG. 3 shows an embodiment of the invention. As illustrated, the phase detecting apparatus of this embodiment comprises a first phase detecting circuit 100, a second phase detecting circuit 200 and a signal selecting circuit 50. The first phase detecting circuit 100 receives the three-phase AC voltages R, S, T whose phase is to be detected, and produces analog three-phase AC voltage signals $e_R$, $e_S$, $e_T$. The second phase detecting circuit 200 receives the three-phase AC voltages R, S, T or the three-phase AC voltage signals $e_R$, $e_S$, $e_T$ and produces a digital phase detection signal $\theta_{200}$. The signal selecting circuit 50 selects the three-phase AC voltages R, S, T or the three-phase AC voltages $e_R$, $e_S$, $e_T$ and makes the selected voltages to be applied to the second phase detecting circuit 200.

The first phase detecting circuit 100 comprises a V/F converter 101, a counter 102, a phase comparator 103, and a low-pass filter 104, which are similar to the V/F converter 1, the counter 2, the phase comparator 3, the low-pass filter 4 shown in FIG. 2, and the phase comparator 103 comprises a three-phase to two-phase converter 131, an ROM 132, D/A converters 133, 133, and an arithmetic operation unit 134 similar to the three-phase to two-phase converter 31, the ROM 32, the D/A converters 33, 33, and the arithmetic operation unit 34 shown in FIG. 2.

The first phase detecting circuit 100 further comprises ROM's (read only memories) 111a–111c which receive the outputs $\theta_{100}$ of the counter 102 as their address information and produces the respective contents at the addresses, the successions of which form three-phase voltages, and D/A (digital-to-analog) converters 112a–112c converting the outputs of the ROMs 111a–111c into analog three-phase voltage signals $e_R$, $e_S$, $e_T$. The three-phase voltage signals $e_R$, $e_S$, $e_T$ are kept in phase with the three-phase voltages R, S, T, by the function of the phase-locked loop, except during a time period until the response time of the phase locked loop expires after an abrupt change occurs in the phase of the voltages R, S, T.

The second phase detecting circuit 200 comprises a V/F converter 201, a counter 202, a phase comparator 203, and a low-pass filter 204 which are similar to the V/F converter 1, the counter 2, the phase comparator 3 and the low-pass filter 4 shown in FIG. 2. Moreover, the phase comparator 203 comprises a three-phase to two-phase converter 231, an ROM 232, D/A converters 233, 233 and an arithmetic operation unit 234, which are similar to the three-phase to two-phase converter 31, the ROM 32, the D/A converters 33, 33 and the arithmetic operation unit 34 shown in FIG. 2.

Each of low-pass filters 104 and 204 is in the form of proportional plus integral type control amplifier, whose transfer function may for example be:

$$\frac{1 + T \cdot S}{T \cdot S} = 1 + \frac{1}{T \cdot S}$$

where S represents a Laplace transform variable, and T represents the time constant. The low-pass filter 104 has a relatively large time constant so that the phase detection response time of the first phase detecting circuit 100 may be a few hundreds msec to 1 sec, while the low-pass filter 204 has a relatively small time constant so that the phase detection response time of the second phase detecting circuit 200 may be 20–30 msec.

The signal selecting circuit 50 comprises a voltage detector 51 judging whether or not all of the three-phase voltages R, S, T are greater than a predetermined magnitude, in other words, whether or not none of the three phase voltages R, S, T is at or near zero because for example of a grounding fault, and a selecting switch 52 selecting the input to the second phase detecting circuit 200.

When the three-phase AC voltages R, S, T supplied to the three-phase thyristor bridge shown in FIG. 1 are greater than the predetermined value, i.e., they are established, the voltage detector 51 makes the selecting switch 52 to select the voltages $e_R$, $e_S$, $e_T$ from the first phase detecting circuit 100. The second phase detecting circuit 200 operates substantially in the same manner as was described with reference to FIG. 2, and produces a digital phase detecting signal $\theta_{200}$.

Assume now the voltage disappears from one or two of the phase voltages R, S, T because, for example, of a grounding fault. In spite of the fault, the first phase detecting circuit 100 continues to produce the three-phase voltages $e_R$, $e_S$, $e_T$ which are in phase with the balanced voltages R, S, T which existed before the occurrence of the fault and which would have continued to exist if the fault had not occurred.

The second phase detecting circuit 200, receiving the outputs $e_R$, $e_S$, $e_T$ of the first phase detecting circuit 100, therefore keeps producing a digital signal $\theta_{200}$ which is also in phase with the voltages R, S, T which existed before the occurrence of the fault.

This state is continued until the expiration of the phase detection response time of the first phase detecting circuit 100, which is a few hundreds msec–1 sec, or until the voltages rise again, whichever is the earlier. The voltages rise usually within 200 msec, so that production of an appropriate phase detecting digital signal $\theta_{200}$ is not interrupted by the fault, or the instantaneous disappearance of the voltage.

Upon transition of the AC line from the "broken" state to "reclosed" state, i.e., when the voltages R, S, T rise from the zero voltage to the rated voltage, the voltage detector 51 detects such transition, and makes the selecting switch 52 to select the three-phase voltages R, S, T.

The output $\theta_{200}$ of the second phase detecting circuit 200, having a quicker detection response, is promptly made to be in phase with the newly established voltages R, S, T.

Upon expiration of a predetermined time period after the rise of the voltages R, S, T, the voltage detector 51 makes the selecting switch 52 to select the outputs $e_R$, $e_S$, $e_T$ of the first phase detecting circuit 100. The above-mentioned "predetermined time period" is set to be a little longer than the detection response time of the first phase detecting circuit 100, so that the switch 52 is made to select the outputs $e_R$, $e_S$, $e_T$ of the first phase detecting circuit 100 after they are made in phase with the voltages R, S, T.

The digital signal $\theta_{200}$ thus obtained may be applied to a firing angle control circuit 60 which determines, responsive to the signal $\theta_{200}$, the firing angle of the thyristors U, V, W, X, Y, Z of the thyristor bridge shown in FIG. 1 and produces firing pulses FU, FV, FW, FX, FY, FZ for the respective thyristors U, V, W, X, Y, Z.

Figure 4:
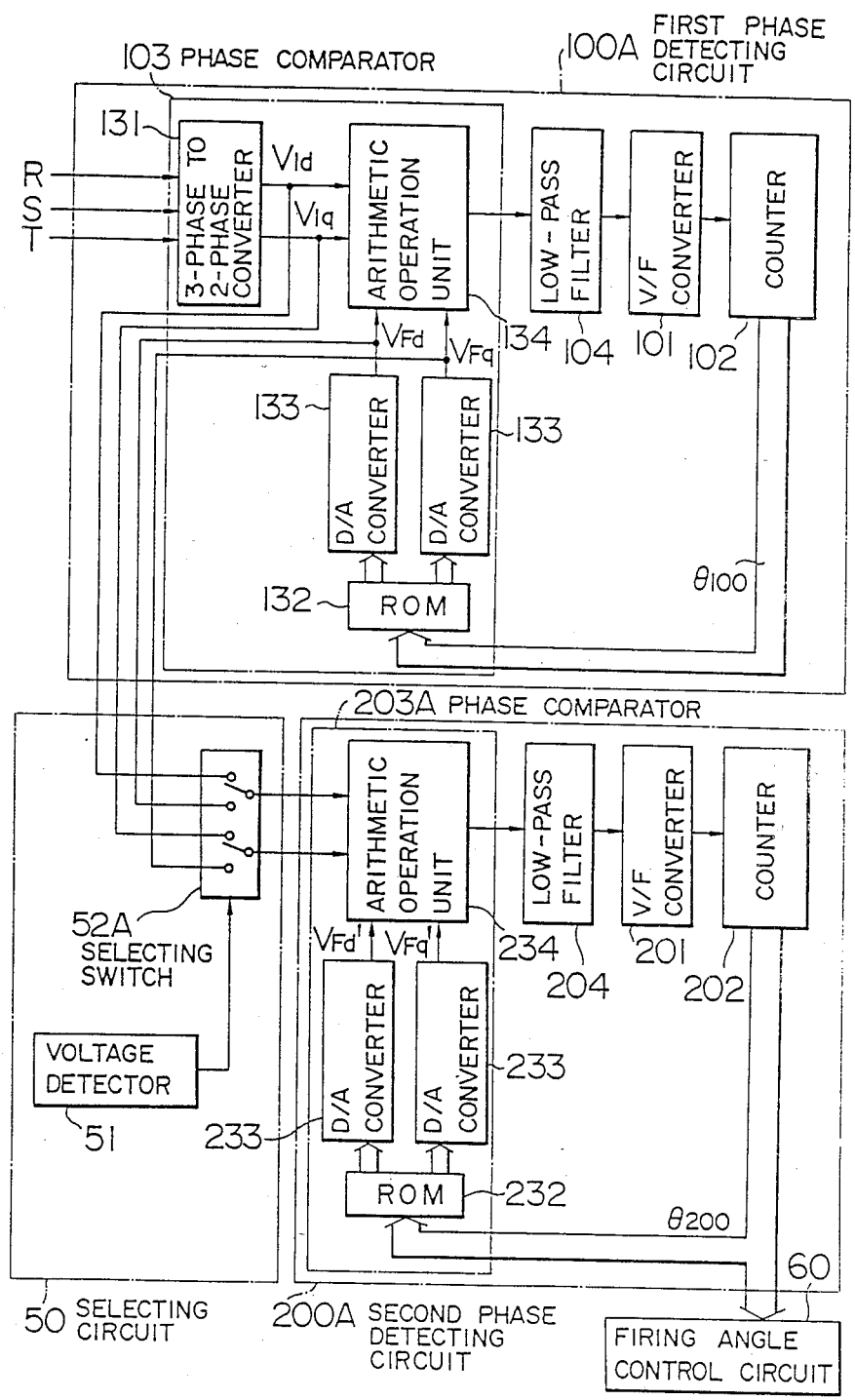
FIG. 4 is a block diagram showing another embodiment of the invention.

FIG. 4 shows another embodiment of the invention. The same reference numerals as in FIG. 3 designate identical or similar components. As seen, the arrangement shown in FIG. 4 is similar to that shown in FIG. 3 but differs from that in FIG. 3 in that the phase comparator 203A does not have a three-phase to two-phase converter 231 of FIG. 3, and the selecting switch 52A is of two-pole type receiving the output of the three-phase to two-phase converter 131 and the outputs of the D/A converters 133, 133 and the arithmetic operation unit 234 receives either of the two-phase AC signals through the selecting switch 52A. Moreover, ROM's 111a–111c and D/A converters 112a–112c of FIG. 3 have been eliminated.

The two-phase voltage signals $V_{Fd}'$, $V_{Fq}'$ from the D/A converters 233, 233 are kept in phase with the voltages R, S, T except during the time period until the expiration of the response time of the phase-locked loop of the first phase detecting circuit 100 after an abrupt change in the phase of the voltages R, S, T. These two-phase voltage signals $V_{Fd}'$, $V_{Fq}'$ can therefore be used in place of the three-phase voltage signals $e_R$, $e_S$, $e_T$ in FIG. 3, and the phase-locked loop of the second phase detecting circuit 200 may be made to "follow" the two-phase voltages $V_{Fd}'$, $V_{Fq}'$.

The embodiment of FIG. 4 is advantageous over the embodiment of FIG. 3 in that the arrangement is simplified because of elimination of the ROM's 111a–111c, D/A converters 112a–112c, and three-phase to two-phase converter 231.

Although the voltages R, S, T have been described as being directly applied to the first and the second phase detecting circuits, they may be applied after level conversion i.e., after they are converted to a smaller level suitable for processing. The reference in the claims to application to and reception by the phase detecting circuits of the AC voltage under detection should therefore be construed to cover application and reception of such converted voltages.

The invention has been described as being applied to phase detection of three-phase AC voltages supplied to a power converter for producing a DC voltage. But the invention is applicable to phase detection of two-phase voltages. This can be done, for instance, simply by eliminating the three-phase to two-phase converter 131 from the arrangement of FIG. 4. The invention is also applicable to phase detection of voltages of any other number of phases. This can be done, for instance, by use of an appropriate phase-number converters in place of the three-phase to two-phase converters. Moreover, use of the phase comparators including the above-described arithmetic operation unit is not essential but any other type of phase comparator can be used.

As has been described, the invention makes it possible to provide an appropriate phase detection signal even when the voltages are unbalanced because of a grounding fault or the like, and also to immediately resume phase detection operation after restoration of the AC voltage subsequent to its disappearance. For this reason, stable firing angle control of the power converter can be continued regardless of the operation condition of the AC line.

What is claimed is:

1. A phase detecting apparatus for detecting a phase of an AC voltage, comprising:
   a first circuit comprising a phase-locked loop, receiving said AC voltage under detection, and producing an AC voltage signal which is in phase with said AC voltage under detection except until expiration of the response time of said phase-locked loop after any abrupt change in the phase of said AC voltage under detection;
   a second circuit comprising a phase-locked loop having a response time which is shorter than the response time of the phase-locked loop of said first circuit; and
   selecting means normally applying said AC voltage signal produced by said first circuit to said second circuit, and applying said AC voltage under detection or an AC voltage signal obtained by phase-number conversion from said AC voltage under detection to said second circuit until a predetermined time has expired after rising of said AC voltage under detection to a predetermined level,
   said second circuit producing a digital signal indicative of the phase of said AC voltage under detection.

2. An apparatus according to claim 1, wherein said phase-locked loop of said first circuit comprises a low-pass filter, and said phase-locked loop of said second circuit comprises a low-pass filter having a time constant shorter than the time constant of said low-pass filter of said first circuit.

3. An apparatus according to claim 2, wherein each of said low-pass filters comprises an operational amplifier having a proportional plus integral transfer function.

4. An apparatus according to claim 1, wherein said phase-locked loop of said first circuit comprises a low-pass filter and a voltage-to-frequency converter responsive to the output of the low-pass filter.

5. An apparatus according to claim 1, wherein said phase-locked loop of said second circuit comprises a low-pass filter and a voltage-to-frequency converter responsive to the output of the low-pass filter.

6. An apparatus according to claim 4, wherein said phase-locked loop of said first circuit further comprises a counter counting pulses produced by the voltage-to-frequency converter, and means producing said AC voltage signal responsive to the count value of said counter.

7. An apparatus according to claim 5, wherein said phase-locked loop of said second circuit further comprises a counter counting pulses produced by the voltage-to-frequency converter and producing said digital signal.

8. An apparatus according to claim 4, wherein said phase-locked loop of said first circuit further comprises a phase comparator receiving said AC voltage under detection and a AC voltage signal produced by the phase-locked loop and producing an analog-type phase difference signal indicative of the phase difference between the two, said low-pass filter receiving said phase difference signal.

9. An apparatus according to claim 5, wherein said phase-locked loop of said second circuit comprises a phase comparator receiving the input to said second circuit as selected by said selecting means and an AC voltage signal which is produced by the phase-locked loop of said second circuit and producing an analog-type phase difference signal indicative of the phase difference between the two, said low-pass filter of said second circuit receiving said phase difference signal.

10. An apparatus according to claim 8, wherein said phase comparator comprises an analog-type arithmetic operation unit determining the phase difference between two sets of two-phase AC voltage signals.

11. An apparatus according to claim 9, wherein said phase comparator comprises an analog-type arithmetic operation unit determining the phase difference between two sets of two-phase AC voltage signals.

12. An apparatus according to claim 10, wherein said phase comparator further comprises means converting said AC voltage under detection into two-phase AC voltage signals which form one of said two sets of two-phase AC voltage signals, said means having substantially no response delay in the conversion, and said phase-locked loop producing two-phase AC voltage signals which form the other of said two sets of two-phase AC voltage signals.

13. An apparatus according to claim 1, wherein said AC voltage signal produced by said first circuit is in the form of a set of two-phase voltage signals, and said phase-locked loop of said first circuit comprises an analog-type arithmetic operation unit receiving a set of two-phase voltage signals which are either said AC voltage under detection or signals obtained by phase-number conversion from said AC voltage under detection, and said set of two-phase voltage signals produced by said first circuit, and determining the phase difference between the two sets of two-phase voltage signals.

14. An apparatus according to claim 13, wherein said phase-locked loop of said second circuit produces a set of two-phase voltage signals, and comprises an analog-type arithmetic operation unit receiving the input to said second circuit as selected by said selecting means, which input forms a set of two-phase voltage signals, and said set of two-phase voltage signals produced by said phase-locked loop of said second circuit and determining the phase difference between the two sets of two-phase voltage signals.

15. A firing angle control system for a power converter converting an AC voltage into a DC voltage, comprising:
   a phase detecting apparatus including:
      a first circuit having a phase-locked loop, receiving said AC voltage, and producing an AC voltage signal which is in phase with said AC voltage except until expiration of the response time of said phase-locked loop after any abrupt change in the phase of said AC voltage,
      a second circuit having a phase-locked loop having a response time which is shorter than the response time of the phase-locked loop of said first circuit, and
      selecting means normally applying said AC voltage signal produced by said first circuit to said second circuit and applying said AC voltage or an AC voltage signal obtained by phase-number conversion from said AC voltage to said second circuit until a predetermined time has expired after rising of said AC voltage to a predetermined level,
      said second circuit producing a digital signal indicative of the phase of said AC voltage, and
   means responsive to said digital signal for performing phase control over the switching element forming arms of said power converter.

* * * * *